US008252871B2

(12) United States Patent
Aliyev et al.

(10) Patent No.: US 8,252,871 B2
(45) Date of Patent: Aug. 28, 2012

(54) CATALYST FOR OLIGOMERIZATION OF ETHYLENE, METHOD FOR ITS PREPARATION AND OLIGOMERIZATION PROCESS USING THE CATALYST

(75) Inventors: Vugar Aliyev, Riyadh (SA); Mohammed Al-Hazmi, Riyadh (SA); Fuad Mosa, Riyadh (SA); Uwe Rosenthal, Lambrechtshagen (DE); Bernd H. Müller, Rostock (DE); Marko Hapke, Rostock (DE); Normen Peulecke, Wismar (DE); Anina Wöhl, Pullach (DE); Peter M. Fritz, Unterhaching (DE); Heinz Bölt, Wolfratshausen (DE); Wolfgang Müller, Munich (DE); Florian Winkler, Munich (DE); Anton Wellenhofer, Munich (DE)

(73) Assignees: Saudi Basic Industries Corporation, Riyadh (SA); Linde AG, Munich (DE)

( * ) Notice: Subject to any disclaimer, the term of this patent is extended or adjusted under 35 U.S.C. 154(b) by 0 days.

(21) Appl. No.: 12/736,387

(22) PCT Filed: Mar. 4, 2009

(86) PCT No.: PCT/EP2009/001518
§ 371 (c)(1),
(2), (4) Date: Mar. 21, 2011

(87) PCT Pub. No.: WO2009/121456
PCT Pub. Date: Oct. 8, 2009

(65) Prior Publication Data
US 2011/0172370 A1    Jul. 14, 2011

(30) Foreign Application Priority Data
Apr. 4, 2008 (EP) .................................... 08006851

(51) Int. Cl.
*C08F 112/14* (2006.01)
*C08F 8/40* (2006.01)
*C08F 8/42* (2006.01)
*C07C 2/24* (2006.01)
(52) U.S. Cl. ...................... 525/333.6; 525/340; 585/512
(58) Field of Classification Search ............... 525/333.6, 525/340; 585/512
See application file for complete search history.

(56) References Cited

FOREIGN PATENT DOCUMENTS
WO    WO 2004056479 A1    7/2004
WO    WO 2004056479    *    8/2004

OTHER PUBLICATIONS

Tagiyev et al., "Synthesis of nickel-organic complexes grafted on the surface of SiO2 as catalysts for ethylene oligomerization reaction", Jan. 1, 1900, CA,, XP002357441 Abstract.

* cited by examiner

*Primary Examiner* — William Cheung
(74) *Attorney, Agent, or Firm* — Kramer Levin Naftalis & Frankel LLP

(57) ABSTRACT

The present invention relates to a catalyst for oligomerization of ethylene, comprising a functionalized solid support; a ligand immobilized on the solid support by chemical bonding, wherein the immobilized ligand has the structure $(R_1)(R_2)P-N(R_3)-P(R_4)-Y$-support or $(R_1)(R_2)P-N(R_3)-P(R_4)-N(R_5)-P(R_6)-Y$-support, wherein $R_1$, $R_2$, $R_3$, $R_4$, $R_5$ and $R_6$ are independently selected from aliphatic group, aryl group, amino group and trimethylsilyl group and Y is the functional group of the support or a derivative thereof; and a chromium compound reacted with the ligand; and to a method for its preparation and a process for oligomerization of ethylene utilizing the catalyst.

20 Claims, 1 Drawing Sheet

Figure 1:
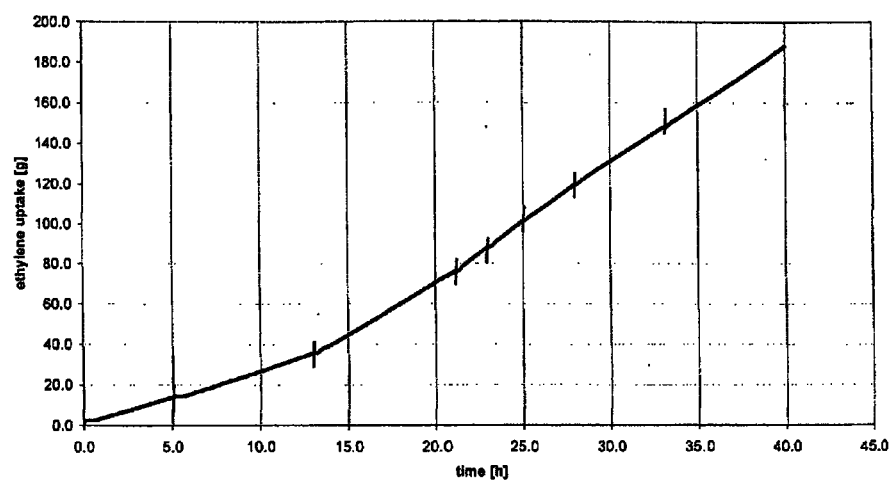

CATALYST FOR OLIGOMERIZATION OF ETHYLENE, METHOD FOR ITS PREPARATION AND OLIGOMERIZATION PROCESS USING THE CATALYST

The present invention relates to a catalyst for oligomerization of ethylene, a method for its preparation and a process for oligomerization of ethylene utilizing that catalyst.

Existing processes for the production of linear alpha olefins (LAOs), including comonomer-grade 1-butene and 1-hexene, rely on the oligomerization of ethylene. These processes have in common that they lead to a product distribution of ethylene-oligomers of chain length 4, 6, 8 and so on. This is due to a chemical mechanism which is widely governed by competing chain growth and displacement reaction steps, leading to a Schulz-Flory or Poisson product distribution.

From the marketing point of view, this product distribution poses a formidable challenge for the full-range alpha olefins producer. The reason is that each market segment served exhibits a very different behavior in terms of market size and growth, geography, fragmentation etc. It is, therefore, very difficult for the producer to adapt to the market requirements since part of the product spectrum might be in high demand in a given economic context, while at the same time other product cuts might not be marketable at all or only in a marginal niche.

Thus, the on-purpose production of the most economically viable LAOS, i.e. comonomer-grade 1-hexene, appears highly desirable.

To meet the requirements regarding high single-$\alpha$-olefin selectivities, especially high 1-hexene selectivities, new processes have been developed. The only known selective C6-commercial process has been commissioned by Chevron Phillips, see J. T. Dixon, M. J. Green, F. M. Hess, D. H. Morgan, "Advances in selective ethylene trimerisation—a critical overview", Journal of Organometallic Chemistry 689 (2004) 3641-3668.

Furthermore, patent applications have been filed by Sasol (WO 03/053891 A1) disclosing chromium-based selective ethylene-trimerization catalyst systems, typically of the type $CrCl_3$(bis-(2-diphenylphosphino-ethyl)amine)/MAO(methylaluminoxane). Also disclosed were variations of the ligand structure (e.g. bis(2-diethylphosphino-ethyl)-amine, pentamethyldiethylenetriamine etc.). However, all these complexes generate considerable amounts of unwanted side products such as LAOs other than 1-hexene and polyethylene.

A large body of scientific publications and patent literature describes the use of chromium-based metal-organic complexes with ligands featuring the basic PNP-structure (for example bis(diphenylphosphino)amine-ligands), see. S. McGuinness, P. Wasserscheid, W. Keim, C. Hu, U. Englert, J. T. Dixon, C. Grove, "Novel Cr-PNP complexes as catalysts for the trimerization of ethylene", Chem. Commun., 2003, 334-335 and K. Blann, A. Bollmann, J. T. Dixon, F. M. Hess, E. Killian, H. Maumela, D. H. Morgan, A. Neveling, S. Otto, M. J. Overett, "Highly selective chromium-based ethylene trimerisation catalysts with bulky diphosphinoamine ligands", Chem. Comm., 2005, 620-621, or the SNS-structure, see D. S. McGuinness, D. B. Brown, R. P. Tooze, F. M. Hess, J. T. Dixon, A. M. Z. Slavin, "Ethylene Trimerization with Cr-PNP and Cr-SNS Complexes: Effect of Ligand Structure, Metal Oxidation State, and Role of Activator on Catalysis", Organometallics 2006, 25, 3605-3610 and A. Jabri, C. Temple, P. Crewdson, S. Gambarotta, I. Korobkov, R. Duchateau, "Role of the Metal Oxidation State in the SNS-Cr Catalyst for Ethylene Trimerization: Isolation of Di- and Trivalent Cationic Intermediates, J. Am. Chem. Soc. 2006, 128, 9238-9247 for trimerization and also tetramerization of ethylene. Excess amounts of MAO are most commonly used as activator/co-catalyst.

While the majority of the published studies rely on Cr-PNP complexes, some deal with other ligands, e.g. of the general formula (R1)(R2)P—X—P(R3)(R4), where X is a bivalent organic bridging group, see WO 2005/039758 A1, or deal with entirely different complexes, such as titanocenes, see H. Hagen, W. P. Kretschmer, F. R. van Buren, B. Hessen, D. A. van Oeffelen, "Selective ethylene trimerization: A study into the mechanism and the reduction of PE formation", Journal of Molecular Catalysis A: Chemical 248 (2006) 237-247. In either case, the major concern is always selectivity and minimization of polyethylene formation.

$\alpha$-Olefin selectivities are, in fact, of major concern in the prior art but the same applies to the catalyst's turnover rate as well. Consequently, recent publications (H. Hagen, "Determination of Kinetic Constants for Titanium-based Ethylene Trimerization Catalysts", Ind. Eng. Chem. res., 2006, 45, 3544-3551) deal with reaction network and kinetics of titanium-based ethylene trimerization. From a technological point of view, the catalyst's specific activity is important due to several aspects:

Very low specific activities will inevitably result in either too high amounts of required catalyst or in prohibitively large equipment, leading to excessive cost in both cases. Conversely, very high turnover rates may cause problems with heat removal, conjuring up the threat of reaction runaway with all negative consequences, like compromising plant integrity and posing serious threats to safety.

Thus, the selective ethylene di- and trimerization-catalysts and processes disclosed so far in scientific and patent literature generally have to cope with the following challenges:

Low selectivities to the value-products, e.g. 1-hexene, giving rise to the formation of undesired by-products from side reaction channels.

Limited purities of the products, i.e. the selectivities within the specific C6-cut are suboptimal due to isomerization, branched olefin formation, etc.

Wax formation, i.e. formation of heavy, long-chain, high carbon—number products.

Polymer formation, e.g. polyethylene, branched and/or cross-linked PE; this leads to considerable losses in product yield and to fouling of equipment.

Poor turnover rates/catalyst activity, resulting in high cost per kg product.

High catalyst- and/or ligand-cost.

Difficult ligand synthesis, resulting in poor availability and high overall catalyst cost.

Susceptibility of catalyst performance to trace impurities, in terms of both activity and selectivity (catalyst losses/catalyst poisoning).

Difficult handling of catalyst components in a technical environment: synthesis of the catalyst-complex, pre-mixing, inertization, catalyst- or ligand recovery. This is mainly due to the fact that the prior art-systems are homogeneous catalyst systems. Consequently, they are subject to the usual difficulties associated with the handling of a reaction mass containing the active constituents in solution: the separation of the physically dissolved catalyst and/or ligand from the reaction mass requires complex and costly unit operations.

Harsh reaction conditions, i.e. high temperatures and pressures, resulting in high invest, maintenance, and energy cost.

High co-catalyst/activator cost and/or consumption.

Poor long-term stability of prior art heterogeneous catalyst systems.

Susceptibility to varying co-catalyst qualities; this is often the case when larger amounts of relatively ill-defined compounds must be used as activators (e.g. certain MAO-varieties).

It is therefore an object of the present invention to provide a catalyst for oligomerization of ethylene which overcomes or at least minimizes the drawbacks of the prior art. Especially, a catalyst shall be provided which avoids the broad spectrum of LAO products and allows for the selective production of the economically most desired products 1-hexene or 1-butene, free from undesired coproducts. Further, the catalyst shall be very stable and robust without leaching of active catalyst components.

Additionally, a method for the preparation of such catalyst as well as a process for oligomerization of ethylene utilizing that catalyst shall be provided.

The first object is achieved by a catalyst for oligomerization of ethylene, comprising a functionalized solid support; a ligand immobilized on the solid support by chemical bonding, wherein the immobilized ligand has the structure $(R_1)(R_2)P$—$N(R_3)$—$P(R_4)$—Y-support or $(R_1)(R_2)P$—$N(R_3)$—$P(R_4)$—$N(R_5)$—$P(R_6)$—Y-support, wherein $R_1$, $R_2$, $R_3$, $R_4$, $R_5$ and $R_6$ are independently selected from aliphatic group, aryl group, amino group and trimethylsilyl group and Y is the functional group of the support or a derivative thereof; and a chromium compound reacted with the ligand.

Preferably the functionalized solid support is an organic or inorganic support.

Most preferred, the functionalized solid support is functionalized with an amine group, preferably a primary amine group.

In one embodiment, a spacer group is provided between the solid support and the functional group.

It is preferably provided that $R_1$, $R_2$, $R_3$, $R_4$, $R_5$ and $R_6$ are independently selected from methyl, ethyl, isopropyl, tert-butyl, phenyl, benzyl, tolyl and xylyl.

Moreover, it is preferred that —Y— is —NH—.

In another embodiment the chromium compound is present at least in an amount necessary to saturate all ligands immobilized on the support.

According to the invention a method is provided for preparing a catalyst for oligomerization of ethylene, comprising the steps:

(i) immobilizing a ligand having the structure $(R_1)(R_2)P$—$N(R_3)$—$P(R_4)$—Cl or $(R_1)(R_2)P$—$N(R_3)$—$P(R_4)$—$N(R_5)$—$P(R_6)X$, with X being a leaving group and $R_1$, $R_2$, $R_3$, $R_4$, $R_5$ and $R_6$ being independently selected from aliphatic group, aryl group, amino group and trimethyl silyl group, on a functionalized solid support via chemical bonding, and (ii) reacting a chromium compound with the immobilized ligand.

Preferably the chromium compound is selected from organic or inorganic salts, coordination complexes and organometallic complexes of Cr(II) or Cr(III).

In a preferred embodiment the chromium compound is selected from $CrCl_3(THF)_3$, Cr(III) acetylacetonate, Cr(III) octanoate, chromium hexacarbonyl, Cr(III)-2-ethylhexanoate and (benzene)tricarbonyl-chromium.

Further preferred is that the functional group is an amine group, preferably a primary amine group.

Moreover, X is preferably selected from Cl, Br or I.

According to the invention is also a catalyst, prepared according to the inventive method.

Additionally a process is provided for oligomerization of ethylene, comprising the step of oligomerizing ethylene in the presence of the inventive catalyst, the catalyst being activated by a cocatalyst.

Preferably, the cocatalyst is selected from trimethylaluminum, triethylaluminum, triisopropylaluminum, triisobutylaluminum, ethylaluminumsesquichloride, diethylaluminumchloride, ethylaluminumdichloride, methylaluminoxane (MAO) or mixtures thereof.

Even preferred, the ratio of Al/Cr is from about 0.1 to 1000, preferably from about 2 to 200.

In one preferred embodiment, the oligomerization is carried out at a temperature of between 10 and 200° C., preferably 20 to 100° C.

The process is preferably a continuous process and mean residence times are between 10 minutes and 20 hours, preferably 1 to 10 hours.

Even preferred, the process is carried out in a stirred tank reactor, a fixed bed flow reactor or a bubble column reactor.

Finally, the oligomerization is most preferably a dimerisation and/or trimerisation of ethylene.

Surprisingly, it was found that the inventive catalyst significantly overcomes the drawbacks of the prior art. Especially, a selective production of 1-hexene and/or 1-butane from ethylene with high yields, high selectivities and high product purities can be achieved without undesired broad product distribution or polyethylene formation. The catalyst has been proven as very stable, robust and high productive catalyst. No leaching of active catalyst components was detected, probably due to strong chemical bonding of the catalyst to the solid support. Further, high process flexibility regarding production rate, selectivity control and reactor concept can be achieved. Further, a simple and straight forward process design for the oligomerization can be provided due to the immobilized system. In detail, no (homogeneous) catalyst separation and recycle step is necessary. The catalyst proposed provides low catalyst/process costs due to the high catalyst stability. The catalyst may be indefinitely re-usable.

In other words, the present invention avoids the general difficulties of homogenous catalysis, such as quenching of the reaction, catalyst separation, recovery and recycle, by immobilizing a very stable and highly selective homogenous catalyst on a solid support. This immobilization is achieved via chemical bonding rather then mere physical adsorption, thus leading to a stable heterogeneous system, comprising the originally homogeneous catalyst and a suitable organic or inorganic support. Therefore, according to the invention, the advantageous properties of the homogeneous catalyst system, such as high activity and excellent selectivity towards the desired product, are combined with the preferred properties of a heterogeneous system from a chemical engineering point of view: no catalyst separation, simple fixed bed or slurry reactive design and ease of operation.

Figure 2:
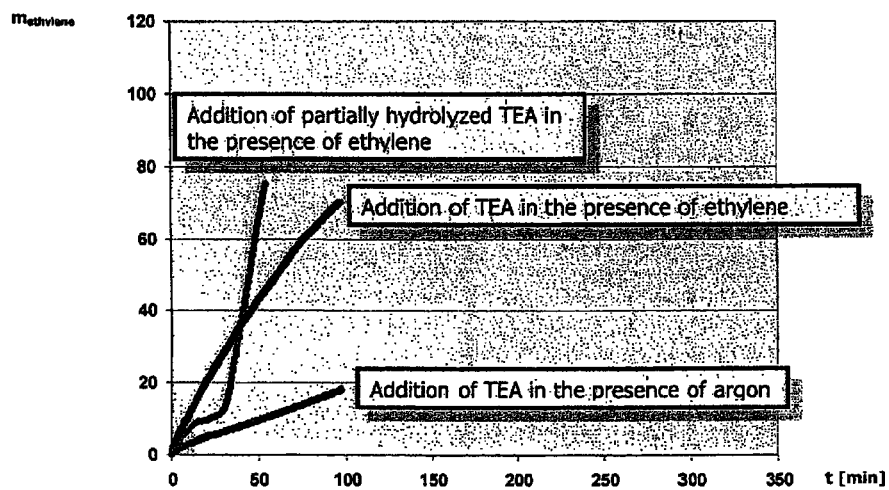

Further advantages and features of the subject-matter of the present invention are now illustrated in the following detailed description with reference to the accompanying drawings, wherein FIG. 1 illustrates the ethylene uptake of an immobilized ethylene trimerization catalyst system (sequenzing batch operation) in dependency on the trimerization time; and FIG. 2 illustrates the influence of different catalyst activation procedures and of variations in activator composition on the reaction rate; ethylene-consumption (grams) versus time (minutes).

CATALYST PREPARATION

In a typical embodiment of the invention, the first step of the catalyst manufacture, comprises the provision of the ligand.

One preferred example of such a ligand is the compound Ph$_2$PN($^i$Pr)P(Ph)Cl, wherein Ph stands for phenyl and $^i$Pr denotes an isopropyl. The synthesis of this class of compounds is known and described for instance in R. J. Cross, T. H. Green, R. Keat, "Conformational Effects on P—N—P Coupling Constants in Diphosphinoamines and Related Compounds", *J. Chem. Soc. Dalton Trans.*, 1976, 1424-1428.

As an example, the synthesis of the preferred compound can be described by the following reaction equation:

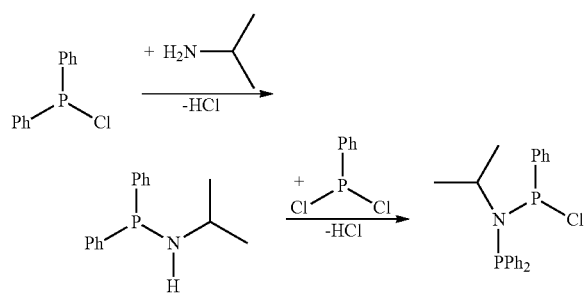

The ligand is then converted to an immobilized ligand system, typically via a reaction with an amine-functionalized support. The support may consist of a polymer (organic or inorganic), a spacer-group and a primary amine Group. Typical examples for suitable supports are

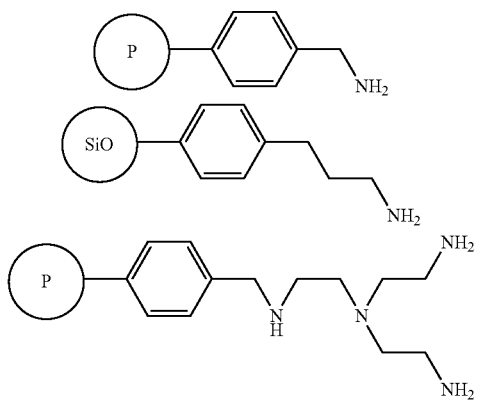

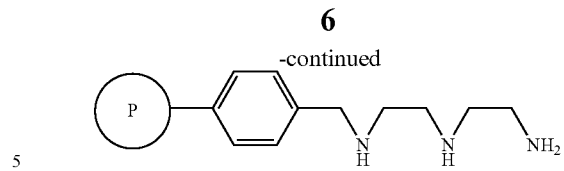

where (P) stands for a polymeric support backbone and (SiO) is an example for an inorganic support. The latter can preferentially be silicon or aluminum-based. Phenyl group is used as a spacer.

Additionally, suitable supports may be also

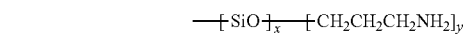

ChemMatrix®:

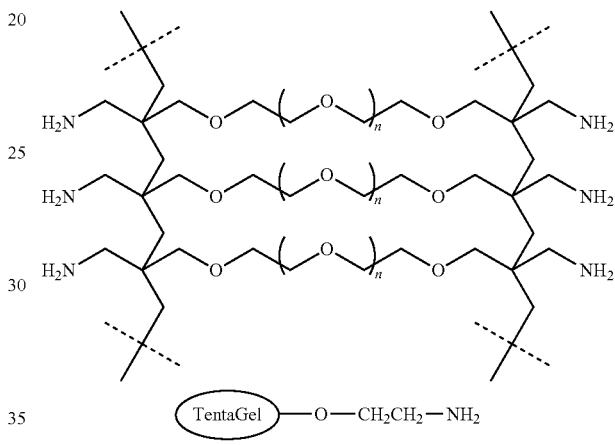

Tentagel® is a cross-linked polystyrene with grafted polyethylene-glycol—side chain. Tentagel® is a trademark of Rapp Polymere GmbH, and ChemMatrix® is a registered trademark of Matrix Innovation, Inc.

Many of those resins are commercially available.

In a preferred embodiment of the invention, a tris-2-(aminoethyl)-polystyreneresin (100-200 mesh, 1% crosslinked with divinylbenzene (DVB), 0.6-1.0 mmol amine/g) is reacted with the ligand according to the following scheme:

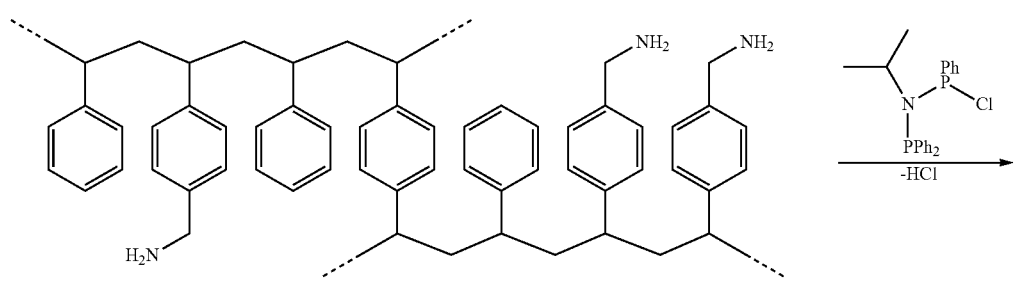

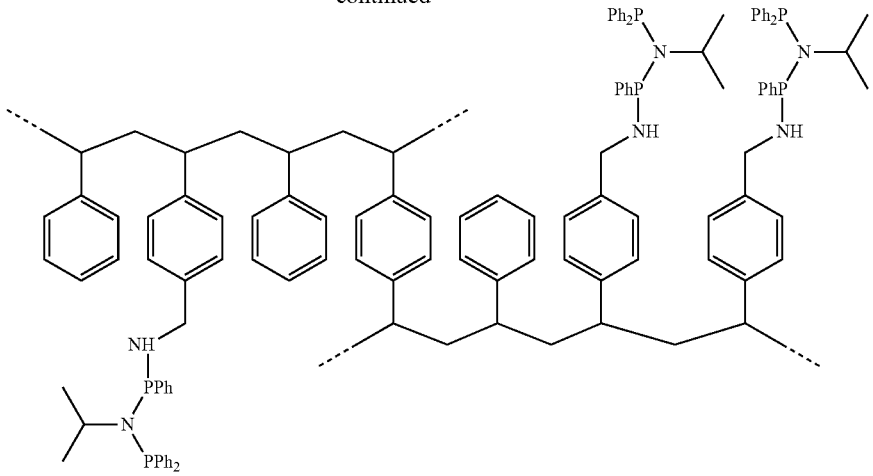

Subsequently, the modified resin undergoes a reaction with a chromium compound to yield the catalyst complex, immobilized via the ligand's bond to the polymeric backbone. In the following example, $CrCl_3.(thf)_3$ is used as a chromium source (thf=tetrahydrofurane):

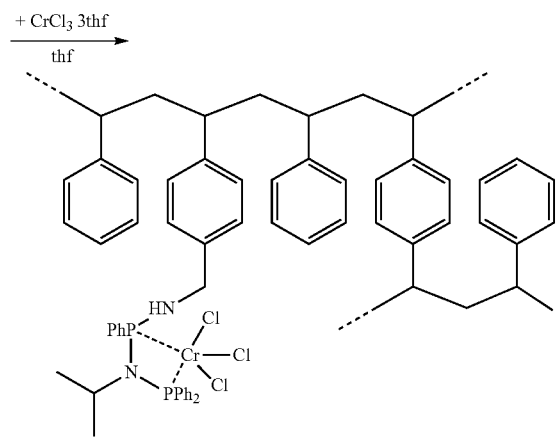

The chromium compound is added in an amount of at least the concentration required to saturate all immobilized ligand—species attached to the polymer backbone. This means, in this particular example, that $CrCl_3(thf)_3$ is added in excess of 1 mmol per g resin. Any other Cr(II) or Cr(III)—organic or inorganic salt or coordination- or organometallic-complex can be used as a chromium source as well.

This immobilized catalyst system is totally equivalent to its homogeneous counterpart and exhibits exactly the same high 1-hexene selectivity.

Catalyst Activation

The active catalyst is prepared by combining the catalyst from the previous step with a co-catalyst, preferentially trimethylaluminum, triethyl aluminum, triisopropylaluminum, triisobutylaluminum, ethylaluminumsesquichloride, diethylaluminumchloride, ethylaluminurndichloride, methylaluminoxane (MAO) or a mixture thereof. The preparation is done under dry inert gas (nitrogen or argon) or dry ethylene. The co-catalyst, also called activator, can also be prepared by partial hydrolysis of any of the aforementioned pure compounds using well defined amounts of water, preferentially 0.1-2000 wt.ppm of water. Typically, the co-catalyst is added as a solution in toluene, so as to result in an Al/Cr—ratio between 0.1 and 1000 mol/mol. The preferred Al/Cr—ratio is 2 to 200 mol/mol.

The solvent toluene can be replaced by other solvents such as aromatic hydrocarbons other than toluene (benzene, ethylbenzene, cumenene, xylenes, mesitylene etc.), aliphatic hydrocarbons (both straight-chain and cyclic, e.g. hexane, octane, cyclohexane), straight-chain olefins like hexene, heptene, octene etc. or ethers like, for example diethylether or tetrahydrofurane.

In general, the function of the co-catalyst is to activate the Cr-complex attached to the immobilized ligand. Most likely, the secondary amine function in the catalyst is deprotonated upon contact with the co-catalyst and the chromium-center is alkylated, thereby starting the catalytic reaction.

α-Olefin Oligomerization Process

The catalyst is subjected to a gas phase of dry ethylene at pressures between 1 and 200 bar, preferentially 10 and 50 bar, in a suitable pressure reactor, either as an agitated slurry/suspension in the solvent or as a solid-phase fixed bed. In the latter case, the fixed catalyst bed is exposed to a flow of ethylene-saturated solvent with a well-defined amount of co-catalyst. Alternatively, a three-phase trickle bed reactor containing the catalyst-beads, the solvent with a defined co-catalyst concentration and an ethylene-stream can be used. In case a slurry reactor is preferred, some means for agitation like e.g. a suitable stirrer should be provided. Alternatively, the slurry bed can be agitated by the ethylene gas-stream itself, e.g. in a bubble-column system. Heat removal can be accomplished by internal or external coolers/heat exchangers, by the solvent's latent heat of evaporation (boiling solvent) or by controlling the temperature via the reactant's flow-in temperatures.

To summarize, the reactor can be of any kind suitable to provide sufficient contact between gas, liquid and solid phase, such as bubble column reactors, slurry-stirred tank reactors, fixed bed flow reactors with fixed or distributed ethylene-injection and the like.

Preferred reaction temperatures are between 10 and 200° C., the most preferred temperature regime is 20 to 100° C. Mean residence times and residence time distributions (in case of a continuous process) are chosen so as to achieve sufficient conversion at high selectivities. Typical mean residence times are between 10 minutes and 20 hours (depending on temperature and pressure). The preferred range is 1 to 10 hours.

Using the described immobilized catalyst system, the process produces 1-hexene with high productivity, high selectivity and very high product (e.g. 1-hexene) purities. Furthermore, virtually no polymer formation was observed. Depending on the exact composition of the co-catalyst, temperature, pressure and residence time, either the 1-hexene yield can be maximized or C6 can be co-produced along with 1-butene. In general, C6-yields in excess of 85-90 wt % can easily be achieved with 1-hexene selectivities (within the total C6-fraction) in excess of 99 wt %.

Most surprisingly, it was found that the immobilized catalyst system shows virtually unlimited stability, i.e. absolutely no deactivation was observed over very long times-on-stream (FIG. 1). This is uncommon for processes involving ethylene oligomerization, since in prior art systems the formation of long-chain or even polymeric byproducts would inevitably block the active catalytic centers on the heterogeneous catalyst surface. This usually results in an almost immediate and total deactivation of the catalyst. In contrast, the catalyst according to this invention does not loose any of its activity and selectivity, regardless of the time of its use under synthesis conditions and regardless how often the continuous or sequencing batch process is interrupted. The reactor can even be opened and the reaction can be re-started without compromising the catalyst's performance. Undoubtedly, this robustness is caused by the extremely high selectivity of the catalyst, thereby avoiding any byproducts which, in turn, would otherwise cause adverse effects regarding the performance.

The catalyst's activity can be adjusted by controlling carefully the amount of partially hydrolyzed co-catalyst in the activator-solution. For instance, the activity can be greatly enhanced by adding toluene, containing small amounts of water, to a triethylaluminum (TEA)/toluene-solution, so as to result in a total water concentration between 0.1 and 2000 wtppm, preferentially 1 to 1000 wtppm. Also, activating the catalyst under ethylene instead of inert gases (Ar, $N_2$) will lead to an increase in activity.

Moreover, the catalyst's activity can also be enhanced by adding electron donor compounds, such as electron-rich aromatic compounds, e.g. alkyl-substituted benzenes.

EXAMPLES

Example 1

Catalyst Preparation

Immobilization of the Ligand 2.2 g $Ph_2PN(^iPr)P(Ph)Cl$ were added to a mixture of 3 g tris-2-(aminoethyl)-polystyrene resin (100-200 mesh, 1% crosslinked with DVB, 0.6-1.0 mmol amine/g), 20 ml diethylether and 5 ml triethylamine. The suspension was stirred for 3 days at room temperature, whereupon an additional precipitate was formed. After filtration, the residue was washed 3 times with methanol, 2 times with diethylether and dried under vacuum to give 2.95 g of the immobilized ligand.

Formation of the Chromium-complex

A solution of 100 mg $CrCl_3.(thf)_3$ in 5 ml tetrahydrofurane (thf) was added to a suspension of 500 mg of the immobilized ligand in 10 ml thf, whereupon the color of the beads changed slowly from pale yellow to green. After additional stirring for 24 h hrs at room temperature, the beads were filtrated off, washed 3 times with thf, 2 times with toluene and were dried under vacuum to give 590 mg of the insoluble complex.

Example 2

Ethylene Trimerization

A 300 ml pressure reactor, equipped with dip tube, internal filtration system, thermowell, gas entrainment stirrer, cooling coil, control units for temperature, pressure, and stirrer speed (all hooked up to a data acquisition system) was inertized with dry argon and filled with 100 ml anhydrous toluene. 0.5 g of the catalyst beads and 4 ml 1.9 mol/l—triethylaluminum (TEA)—solution in toluene were added.

The reactor was sealed, pressurized with 30 bar dry ethylene and heated to 65° C. While stirring at 200 rpm, the ethylene consumption was monitored by the data acquisition system and an electronic balance by constantly weighing the ethylene pressure cylinder. After 5 hours residence time, the reaction in the liquid phase was quenched by transferring the liquid inventory through the internal filtration system to a glass vessel, filled with approx. 100 ml HCl-acidified water (to quench the TEA).

The catalyst beads remained in the reactor for subsequent use without further treatment.

The entire gas phase from the reactor's head space was quantified by a calibrated gas meter and was then collected quantitatively in a purged and evacuated gas bag. After separation of the liquid organic product-phase, the total mass was determined by weighing. Subsequently, the composition of the organic phase was analyzed by GC/FID. The previously collected gas phase was analyzed separately by GC/FID. Based on the measured data, the mass balance was closed and the overall yields and selectivities were determined. 1-Hexene yields were always in excess of 85 wt % at 1-hexene selectivities greater than 99 wt % in the total C6-fraction.

The process was frequently re-started using the same catalyst, just by adding fresh anhydrous toluene, TEA/toluene-solution and 30 bars of ethylene, effectively establishing a long-term sequencing batch-operation.

FIG. 1 shows the ethylene consumption as a function of time-on-stream. Vertical tickmarks indicate the times of reaction-termination and subsequent re-start. The reaction starts out relatively slowly at t=0 hrs but accelerates to a constant 1-hexene growth rate after several days. The reaction continues indefinitely without any loss of selectivity.

In the experiment visualized by FIG. 1, the overall reaction rate was deliberately adjusted to a fairly low level. This was just to ensure that well-controlled and strictly isothermal process conditions could be ensured over the entire experimental run, thus meeting the requirements of good scientific practice, namely not to change several parameters at the same time.

FIG. 2, however, shows that the rate of 1-hexene production can be adjusted over a large range, by controlling carefully activation conditions and activator composition. In fact, the reaction rate can be increased at constant selectivity to figures that are only limited by more chemical engineering considerations, like, e.g. the maximum heat of reaction that can be removed per time unit within a given reactor system.

The features disclosed in the foregoing description, in the claims and in the drawings may, both separately and in any combination thereof, be material for realizing the invention in diverse forms thereof.

The invention claimed is:

1. A catalyst for the oligomerization of ethylene, comprising a functionalized solid support; a ligand immobilized on the solid support by chemical bonding, wherein the immobilized ligand has the structure $(R_1)(R_2)P$—$N(R_3)$—$P(R_4)$—Y-support or $(R_1)(R_2)P$—$N(R_3)$—$P(R_4)$—$N(R_5)$—$P(R_6)$—Y-support, wherein $R_1$, $R_2$, $R_3$, $R_4$, $R_5$ and $R_6$ are independently selected from aliphatic group, aryl group, amino group or trimethylsilyl group and Y is the functional group of the support or a derivative thereof; and a chromium compound reacted with the ligand.

2. A catalyst for the oligomerization of ethylene, comprising a functionalized solid support; a ligand immobilized on the solid support by chemical bonding, wherein the immobilized ligand has the structure $(R_1)(R_2)P$—$N(R_3)$—$P(R_4)$—Y-support or $(R_1)(R_2)P$—$N(R_3)$—$P(R_4)$—$N(R_5)$—$P(R_6)$—Y-support, wherein $R_1$, $R_2$, $R_3$, $R_4$, $R_5$ and $R_6$ are independently selected from aliphatic group, aryl group, amino group or trimethylsilyl group and Y is an amine group or a derivative thereof; and a chromium compound reacted with the ligand.

3. The catalyst according to claim 2, further comprising a spacer group between the solid support and the functional group.

4. The catalyst according to claim 2, wherein the functionalized solid support is functionalized with a primary amine group and $R_1$, $R_2$, $R_3$, $R_4$, $R_5$ and $R_6$ are independently selected from the group consisting of methyl, ethyl, isopropyl, tert-butyl, phenyl, benzyl, tolyl and xylyl.

5. The catalyst according to claim 2, wherein —Y— is —NH—.

6. The catalyst according to claim 2, wherein the chromium compound saturates all ligands immobilized on the support.

7. A method for preparing a catalyst for the oligomerization of ethylene, comprising the steps:
(i) immobilizing a ligand having the structure $(R_1)(R_2)P$—$N(R_3)$—$P(R_4)Cl$ or $(R_1)(R_2)P$—$N(R_3)$—$P(R_4)$—$N(R_5)$—$P(R_6)X$, with X being a leaving group and $R_1$, $R_2$, $R_3$, $R_4$, $R_5$ and $R_6$ being independently selected from aliphatic group, aryl group, amino group and trimethylsilyl group, on a functionalized solid support via chemical bonding, and
(ii) reacting a chromium compound with the immobilized ligand.

8. The method according to claim 7, wherein the chromium compound is selected from organic or inorganic salts, coordination complexes and organometallic complexes of Cr(II) or Cr(III).

9. The method according to claim 7, wherein the chromium compound is selected from $CrCl_3(THF)_3$, Cr(III)acetylacetonate, Cr(III)octanoate, chromium hexacarbonyl, Cr(III)-2-ethylhexanoate and (benzene)tricarbonyl-chromium.

10. The method according to claim 8, wherein the solid support is functionalized with an amine group.

11. The method according to claim 9, wherein X is selected from Cl, Br or I and the solid support is functionalized with a primary amine.

12. A process for the oligomerization of ethylene, comprising the step of contacting ethylene with the catalyst of claim 1 and an activating cocatalyst selected from the group consisting of trimethylaluminum, triethylaluminum, triisopropylaluminum, triisobutylaluminum, ethylaluminumsesquichloride, diethylaluminumchloride, ethylaluminumdichloride, methylaluminoxane (MAO) and mixtures thereof.

13. The process according to claim 12, wherein Y is an amine group.

14. The process according to claim 12, wherein there is a spacer group between the solid support and Y, Y is a primary amine, and the ratio of Al/Cr is from about 2 to about 200.

15. The process according to claim 13, wherein the oligomerization is conducted in a continuous process with a mean residence time between 1 and 10 hours and at a temperature between 20° C. and 100° C.

16. The process according to claim 14, wherein the oligomerization is conducted in a continuous process at a temperature between 20° C. and 100° C. with a mean residence time between 1 and 10 hours.

17. The process according to claim 13, wherein the process is carried out in a stirred tank reactor, a fixed bed flow reactor or a bubble column reactor.

18. The process according to claim 13, wherein the oligomerization is a dimerization or trimerization of ethylene.

19. The process according to claim 15, wherein the oligomerization is a dimerization or trimerization of ethylene.

20. The process according to claim 16, wherein the oligomerization is a dimerization or trimerization of ethylene.

* * * * *